(12) United States Patent
Carter, Jr. et al.

(10) Patent No.: US 7,128,005 B2
(45) Date of Patent: Oct. 31, 2006

(54) NON-POLLUTING HIGH TEMPERATURE COMBUSTION SYSTEM

(76) Inventors: Greg Carter, Jr., P.O. Box 3355, Joplin, MO (US) 64803; Greg Carter, Sr., P.O. Box 3355, Joplin, MO (US) 64803

(*) Notice: Subject to any disclaimer, the term of this patent is extended or adjusted under 35 U.S.C. 154(b) by 0 days.

(21) Appl. No.: 10/703,610

(22) Filed: Nov. 7, 2003

(65) Prior Publication Data

US 2005/0098073 A1 May 12, 2005

(51) Int. Cl.
*F23B 7/00* (2006.01)
*C06B 7/00* (2006.01)

(52) U.S. Cl. .................................. 110/233; 149/2
(58) Field of Classification Search ............... 110/233, 110/234; 60/39, 182, 649; 419/8
See application file for complete search history.

(56) References Cited

U.S. PATENT DOCUMENTS

| | | | |
|---|---|---|---|
| 2,704,437 A * | 3/1955 | Thomsen ................. 60/649 |
| 3,516,880 A * | 6/1970 | Johnson ................. 149/2 |
| 3,731,495 A | 5/1973 | Covency |
| 3,950,957 A | 4/1976 | Zakon |
| 4,019,314 A | 4/1977 | Springmann |
| 4,047,942 A * | 9/1977 | Clark et al. ............. 420/429 |
| 4,250,704 A | 2/1981 | Bruckner |
| 4,424,045 A | 1/1984 | Kulischenko |
| 4,475,340 A | 10/1984 | Tseng |
| 4,492,568 A | 1/1985 | Palz |
| 4,697,415 A | 10/1987 | Shaffers |
| 4,707,980 A * | 11/1987 | Wabeke et al. ......... 60/206 |
| 4,707,994 A | 11/1987 | Shemoy |
| 4,785,621 A | 11/1988 | Alderson et al. |
| 4,962,646 A | 10/1990 | Rathbone |
| 5,040,370 A | 8/1991 | Rathbone et al. |
| 5,076,837 A | 12/1991 | Rathbone et al. |
| 5,081,845 A | 1/1992 | Allam et al. |
| 5,086,720 A * | 2/1992 | Gibran ................. 110/234 |
| 5,123,364 A * | 6/1992 | Gitman et al. .......... 110/346 |
| 5,265,424 A | 11/1993 | Merritt |
| 5,317,862 A | 6/1994 | Rathbone |
| 5,323,849 A | 6/1994 | Korczynski |
| 5,388,395 A | 2/1995 | Scharpf |
| 5,406,786 A | 4/1995 | Scharpf |
| 5,410,869 A | 5/1995 | Muller |
| 5,421,166 A | 6/1995 | Allam et al. |
| 5,437,150 A | 8/1995 | Latham et al. |
| 5,459,994 A | 10/1995 | Drnevich |
| 5,526,580 A | 6/1996 | Zippe |
| 5,578,102 A | 11/1996 | Alexander |
| 5,630,470 A | 5/1997 | Lockwood |
| 5,666,823 A | 9/1997 | Smith et al. |
| 5,722,259 A | 3/1998 | Sorensen |
| 5,724,805 A | 3/1998 | Golomb et al. |

(Continued)

Primary Examiner—Kenneth Rinehart
(74) Attorney, Agent, or Firm—Walter M. Benjamin

(57) ABSTRACT

Disclosed is a non-polluting high temperature combustion system which comprises in combination a graphite-lined combustion chamber fueled by a controlled-burn thermite fuel, wherein the fuel burns a temperature of up to 6000 degrees Fahrenheit, wherein the resulting gases are essentially pollution free; the system also include a means of passing a substrate into and out of the combustion chamber and/or a turbine powered by gases from the combustion products, means of injecting a working fluid into the combustion gases upstream of the turbine, a heat recovery means that comprises a geo-thermal hot rock bed, a steam generator utilizing heat from the geo-thermal hot rock bed, a working fluid separation means which comprises a condenser, and means of liquefying the remaining gases for commercial use.

6 Claims, 3 Drawing Sheets

U.S. PATENT DOCUMENTS

| | | |
|---|---|---|
| 5,740,673 A | 4/1998 | Smith et al. |
| 6,282,901 B1 | 9/2001 | Merritt et al. |
| 6,314,896 B1 | 11/2001 | Marin et al. |
| 6,637,183 B1 | 10/2003 | Viteri et al. |

* cited by examiner

WASTE INCINERATION PLANT – FIGURE 2

NON-POLLUTING HIGH TEMPERATURE COMBUSTION SYSTEM

FIELD OF THE INVENTION

This invention relates to combustion systems that can apply to applications that can tolerate high temperatures, more particularly this invention relates to closed combustion systems that minimize or eliminate pollution, even more particularly this invention relates to closed combustion systems that can apply to applications that can tolerate temperatures between 2500 and 6000 degrees Fahrenheit and minimize or eliminate pollution.

BACKGROUND OF THE INVENTION

In combustion systems which generate heat for industry, power plants, incineration of waste, and the like, fuels such as natural gas, coal, fuel oil, and other fuels are used. To produce the heat from these combustion systems, these fuels are typically burned in compressed air or oxygen enriched compressed air or substantially pure oxygen obtained by gas separation. Because of conservation concerns and the increasing cost of fuel prices and increasingly stringent pollution control, these systems must be thermodynamically efficient and must limit their release of pollutants into the atmosphere within the increasingly stringent control levels. Cost and complexity of the systems and cost of operation are consequently skyrocketing to meet these conditions. A great amount of the cost is when air is used as the oxygen supply. Since air is 75.6% nitrogen, means to remove extremely large amounts of $NO_x$ from the emissions such as by scrubbing becomes necessary. When the fuel contain large amounts of contaminants such as sulfur, then removal of those contaminants such as $SO_2$ by utilizing a fluidized bed or by a flue gas desulfurization process such as by absorption is necessary. Equipment for such removal is expensive and its use results in substantial parasitic power loss and inefficiency.

High temperature combustion systems are necessary for industrial applications such as glass, steel, aluminum, paper and pulp industry and cement manufacturing, to name a few industrial applications. Incineration of municipal wastes also require high temperature combustion systems. High temperature is necessary to decompose or at least make molten materials for processing or disposal. Consequently, high temperatures have been used to dispose of waste. Oxygen-enriched air or substantially pure oxygen is sometimes used for multi-staged combustion or high temperature processes which usually result in fuel savings, production increase and reduced waste processing. Oxygen-enriched air increases the adiabatic temperature of the flame thus increasing the local radiative heat transfer. Further, it reduces the mass fraction of nitrogen. and thus reducing $NO_x$ emissions. But a large air separation unit which produce gaseous oxygen is expensive or cost prohibitive and the power consumption of this process can represent around 50 percent of the overall production costs. New chemical and refining processes, and the economies of scale of such processes, will require increasing quantities of gaseous oxygen at a single location. Requirements for 15,000 tons per day or more, of gaseous oxygen delivered at pressures of 1,250 psia or higher are anticipated for such processes.

In all of these systems a large amount of heat can be lost in the flue gases. To reduce energy loss, heat recovery systems are used that capture heat of the flue gasses and transfer it to another medium directly or such as through a working fluid to perform useful work as mechanical energy, electrical energy, chemical energy, and the like. One way useful work is achieved is passing the working fluid through a turbine to generate electricity. This working fluid can also be used for other processes. Economy can be achieved by transferring the heat back into the combustion fuel or preheating the load material. In all of these systems there is a remainder of the flue gas that must be extensively and very costly treated for pollutants and exhausted into the atmosphere at pollution levels within governmental controls.

U.S. Pat. No. 6,637,183 issued to Viteri et. al., for example, discloses a stationary power plant which utilizes a semi-closed Brayton Cycle Gas Turbine Power System that can convert an open combined cycle gas turbine into a reduced or zero emissions power system. The system includes a compressor which compresses air and combusts the air with a hydrocarbon fuel. The products of combustion and the remaining portions fo the air from the exhaust is expanded through a turbine. The turbine drives the compressor and outputs power. The exhaust exits the turbine and then is routed through a heat recovery steam generator. A bottoming cycle portion of the system includes a gas generator which combusts a hydrocarbon fuel with oxygen. Water is also entered into the gas generator where it is heated and combined with the products of combustion before entering a bottoming turbine. The water is then separated and routed back to the gas generator after preheating within the heat recovery steam generator. This system depicts the extent of costly equipment and extent of treatment needed to deal with the ordeal of the use of air as the supply of oxygen.

It is desirable to have a combustion system that would be an economical closed combustion system that eliminated pollutants. Avoiding the use of air for the oxygen supply would be necessary. Using contaminant free fuel or means of economically eliminating the contaminant from the fuel will also be necessary. Heretofore, the most pollution free combustion systems have been a closed Brayton cycle using nuclear power, solar or geothermal heat source to heat a working fluid. Because that working fluid is not exhausted, it would not be a source of atmospheric pollution. Those heat sources are renewable non-polluting heat sources so that atmospheric emissions are avoided. However, these systems suffer from drawbacks which have limited their ability to be fully competitive with hydrocarbon fuel combustion systems.

SUMMARY OF THE INVENTION

Applicants have discovered that in all high volume applications such as industrial processes, and where the application can tolerate a combustion system that reaches temperatures high enough can operate essentially without emitting pollutants. The high temperature allows incineration of all potential pollutants thereby rendering them an inert or harmless or useful gas or into inert particulate matter. Preferably, the gases taken out of the cycle will be marketable. The particulate matter can be removed by means known in the art. It has been discovered that if the combustion system utilizes a fuel that can reach temperatures between 2500 and 6000 degrees Fahrenheit, that all of the potential pollutants will be incinerated into inert gases and solids with the remaining gases being potentially harmless or useful, such as CO and $CO_2$. These gases can be bottled and sold. The smaller volume of the essentially inert solids removed from the system can be disposed efficiently. The pressure of the emitted gasses and excess heat from the combustion system can be transferred to a closed working fluid system such as steam or helium and converted to useful work, especially electricity, as stated above. The fuel utilized is a thermite compound which has a controlled burn rate at a temperature of up to 6000 degrees Fahrenheit such as that described in U.S. Pat. No. 6,627,013 issued to Greg Carter, Jr. et. al. This fuel can be used in conjunction with other fuels such as coal, natural gas, fuel oil, industrial waste and other wastes heretofore prohibited because of low heat values or impurity with potential pollutants.

DETAILED DESCRIPTION OF THE INVENTION

Figure 1:
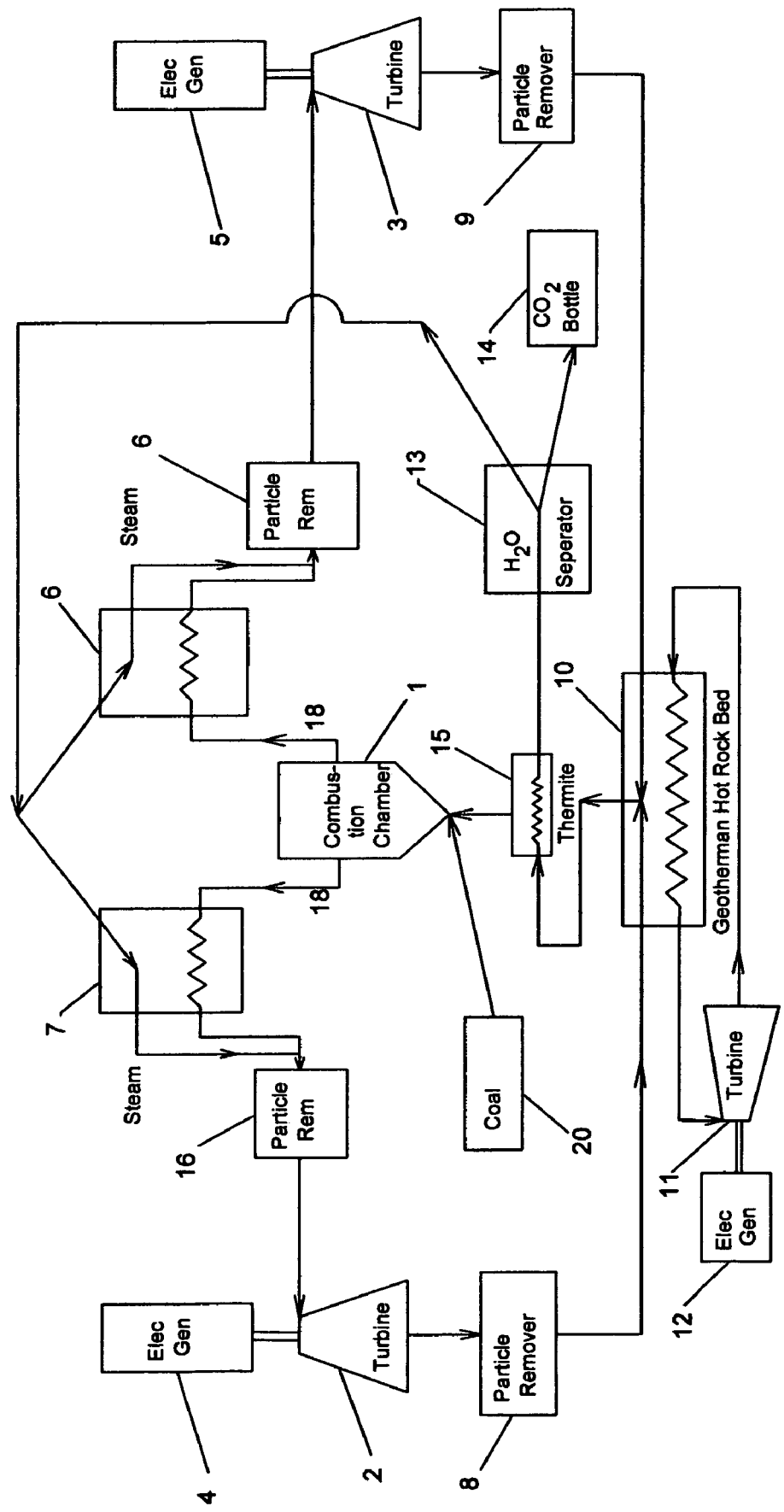
FIG. 1 is a schematic of the first embodiment of the invention, a power plant.

According to Applicants' invention a combustion system for industrial processes is provided that reaches high temperatures. By "high temperatures" it is meant up to 6000 degrees Fahrenheit, preferably between 2500 and 6000 degrees Fahrenheit, even more preferably 3400 degrees Fahrenheit. By "industrial processes" it is meant high volume processes subject to emit pollutants above the governmental level. Industrial processes include incineration of municipal waste and other waste and hazardous materials, power plant processes, processes for treatment of metals, production of cement, glass and other products and the like. The system is provided with a fuel that burns with a temperature up to 6000 degrees Fahrenheit. Thermite compositions are very well known and consist generally of a mixture of a finely divided, strongly reducible metal oxide, and a finely divided strong reducing agent, typically consisting of aluminum. Once ignited, the composition reacts highly exothermically as the strong reducing agent has negative free energy, typically above 90,000 calories per gram atom of oxygen at a reference of 25° C. and the strongly reducible metal oxide has a negative free energy as high as about 60,000 calories per gram atom of oxygen at a reference of 25° C. This reaction reaches temperatures above 2500 degrees Fahrenheit, to about 6000 degrees Fahrenheit. Consequently, the reaction releases 90,000 calories and free oxygen at a very high rate. Other types of thermite compositions containing metals and the oxides of other metals other than iron oxide are known. The metal oxides include $FeO$, $Fe_2O_3$, $CoO$, $NiO$, $Cu_2O$, $CuO$, $Sb_2O_3$, $MnO_2$, $MoO_2$, $MoO_3$, $Cr_2O_3$, $PbO_2$, $WO_2$, $WO_3$ and others. The Oxidizable metals include Al, Si, Zr, Be, Mg, Ba, Ti, B and others.

Thus a fuel supply comprising a thermite composition having a controlled burn rate such as taught in U.S. Pat. No. 6,627,013 issued to Greg Carter, Jr. et. at. would be ideal for Applicants's combustion system. As taught in the patent, it is preferred that in proportions as taught in the patent. Accordingly, preferred is a thermite composition for pyrotechnics which comprises a combination of and ratio of at least two of the metallic oxides taken from the group consisting of $FeO$, $Fe_2O_3$, $Cu_2O$, $CuO$, $MnO$, $MnO_2$, $MoO_2$, $MoO_3$, $WO_2$, and $WO_3$ and a strong reducing agent. The addition of a strong oxidizing agent further enhances the controllability of the thermite composition. The composition is controllable (control-burn) to achieve a desired gas production and temperature combination. The ingredients that may be added to the composition are modulators, accelerators, gas generating compounds, binders, and diluents. By "modulator", it is meant an agent that slows down the rate of the reaction or otherwise reduce the intensity of the reaction. By "accelerator" it is meant an agent that increases the intensity of the reaction. Certain of these compositions can be environmentally safe, can be made from readily available and relatively inexpensive materials, does not produce a light harmful to the eyes and can be adapted so as not to produce an excessive amount of smoke or harmful fumes.

This fuel can also include in its mixture high sulfur content coal, oil shale, oil sludge, industrial waste products, other waste products or other fuel products that have been economically prohibitive because of their potential to produce hazardous products and pollutants. This composition of the fuel mixture is fashioned so that the oxygen that is released from the thermite compound is sufficient for total combustion of the other fuel in the mixture. Consequently, there is no need for air or other oxygen source for the fuel mixture to burn completely. However, it is also contemplated that a reduced amount of air or an independent oxygen source can be used.

This fuel mixture is ignited in a combustion chamber that is lined with graphite according to means well known in the art or with other material suitable for insulating the chamber to withstand temperatures up to 6000 degrees Fahrenheit, preferably between 2500 and 6000 degrees Fahrenheit, such as ceramic material and other refractory materials. This combustion chamber has a fuel port coupled with the controlled-burn thermite fuel supply and at least one outlet port for combustion gases. For some industrial processes, it will have a port for receiving a substrate. Because of the high temperatures achieved, essentially all of the products of the combustion will be gasified in the combustion chamber. Through calculation by means known in the art, the mixture will be in proportion to achieve gaseous products having a temperature between 2500 degrees Fahrenheit and 6000 degrees Fahrenheit, and even more preferably 3400 degrees Fahrenheit. Whatever particulate matter in the combustion products will be carried along with the force of the released flue gases. The gases and particulate matter released will vary depending upon the fuel mixture. In the case of a fuel mixture of the thermite compound and high sulphur content coal, it is believed that the gaseous products will essentially be $CO$, $CO_2$ and $H_2O$.

Heat from the combustion can be transferred by radiation and convection for productive work either directly or by working fluids flowing through graphite lined conduits. Heat from this combustion can be applied directly to substrates such as cement kilns, glass furnaces, smelting, melting, and refining and the like, wherein the substrate is passed through the combustion chamber to transfer heat by radiation. Means known in the art will pass the substrate into and out of the combustion chamber. Where convective heat is important, a heat exchanger structures lined with graphite, ceramic or other refractory material can be designed with parameters suitable for that particular application. Steam or some other working fluid can be injected by a means directly into the path of the high temperature flue gases that will increase volume and pressure of the stream suitable to turn a turbine for work such as compressors and generating electricity. This working fluid injection means has an output port in communication with the combustion gas stream, and an input port, wherein the injection means is upstream of the turbine. This steam or other working fluid need not be exhausted but circulated in a closed Brayton cycle so that it would not be a source of pollution. By this type of steam or other working fluid injection, high efficiencies and high power output are provided without requiring a separate steam turbine and condenser as required in a combined cycle.

Because of the anticipated high volumes of gas that can be released from this combustion chamber, it is anticipated that multiple opposing conduits can emanate from the combustion chamber so that the hot gases can be released in opposing directions. Consequently, the combustion chamber can be "center fired" so that the burn of the fuel can proceed in more than one direction toward the conduits. By "center fired" it is meant that the progression of the burn and release of gases therefrom proceeds in more than one direction. In this case each conduit can be the source of radiative and convective heat. Each of the conduits can be injected with a working fluid such as steam for turning a turbine, for example. Heat transfer patterns within the various areas of the combustion chamber such as radiation zones and convection zones can be calculated by means well known in the art. This injected working fluid also operates as a cooling fluid to assure the temperature of sensitive components located in high temperature parts of the vapor pressure generator will not exceed a value which may cause damage to those components.

It is anticipated that after passing the flue gas along with a working fluid through a zone such as a turbine, there will still be a considerable amount of heat in the exhaust gases. This turbine will have an inlet port in communication with the combustion chamber to receive the combustion gases, an outlet port for the combustion gases and a power outlet for a generator or compressor and the like. To reduce energy loss, heat recovery systems are used that capture the heat of the exhaust gases from the turbine and transfer it to another medium to perform useful work. The heat recovery means has an input port in communication with the output port of the turbine and an output port for the combustion gases and working fluid. One such medium that can be utilized is a geo-thermal hot rock bed chamber that utilizes another closed Brayton cycle in which a working fluid that remains separate from the hot rock heat source is circulated. This working fluid, preferably steam, is passed through another turbine and recirculated from the turbine exhaust back through a compressor (if necessary) powered by the turbine. The closed cycle means the working fluid will not be exhausted and thus no potential pollution.

The gases from the heat recovery means with pass to a means for removing the steam from the gas stream. Such a means include a condenser. This working fluid removal means is downstream of the heat recovery means and the working fluid removal means will have an inlet port in communication with the output port of the heat recovery means. The inlet port receives the combustion gases and working fluid from the heat recovery means and the working fluid removal means has a outlet for the remaining gases. The water removed from this stream is recirculated back to the steam injection means. The remaining gases is anticipated to be CO and $CO_2$ which will be bottled for commercial use.

Figure 3:
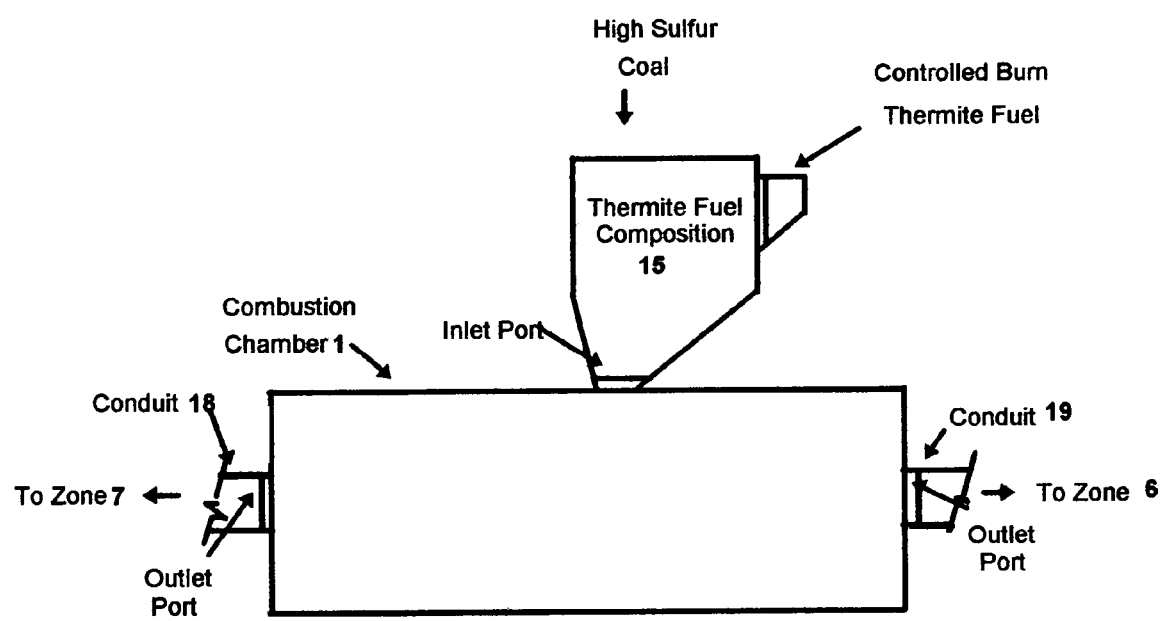
FIG. 3 is a diagram of a combustion chamber having a fuel port coupled with a thermite fuel supply.

Reference is now made to FIG. 1. In a preferred embodiment of this invention, a high temperature graphite-lined combustion chamber 1 is provided for an electrical power plant. In this embodiment of the invention a controlled-burn thermite fuel composition 15 mixed with a high sulphur content coal is center fed into the graphite lined combustion chamber 1 (see FIG. 3) to burn at about 3400 degrees Fahrenheit. The gases emanating from the combustion is released at a high volume, high pressure through two opposing graphite lined conduits 18 and 19 leading to a zone 6 and 7 which injects steam into the stream to further increase pressure and lower temperature. Particulates formed by the lowering of the temperature of the gas stream are removed by means 16 and 17 well known in the art to avoid potential damage to the turbine fins downstream. The gases passes through the turbines 2 and 3 in which its temperature and pressure are decreased. The turbines 2 and 3 powers generators 4 and 5 which produce electricity. Exhaust gas from the turbines 2 and 3 are passed through another means 8 and 9 for removing particulates, such as a dust collector, from the gas stream thereby lowering the temperature and pressure of the gases exhausted from the turbines 2 and 3. The gases are then passed through a geo-thermal hot rock bed 10 thereby transferring heat by convection in a heat exchanger to superheat steam in a stream that is separate from the hot rock heat source. This superheated steam powers a third turbine 11 which turns a generator 12 which generates electricity. The steam emitted from the third turbine 11 is recirculated in a closed system. Exhaust gases from the geo-thermal hot rock is used to preheat thermite fuel 15 entering the combustion chamber 1 and then the steam is passed through condenser 13 where the gases are separated and recirculated back to be injection means 6 and 7 upstream of the turbines 2 and 3. The remaining gas (believed to be only CO and $CO_2$) is removed from the system by a removal and liquefying means 14 and bottled for commercial use.

In another preferred embodiment of this invention, a high temperature combustion chamber is provided to incinerate waste which can include hazardous waste. These waste are typically made into refuse-derived fuels which are produced by pulverizing and classifying, adding additives such as quicklime, and compacting for pelletization. Also municipal waste can be processed by crushing, adding to water and mixing, and converting to an oily fuel by a hydrothermal reaction. It is also contemplated that this invention can be used to incinerate organic materials including oil shale, garbage, carcasses of beasts, waste clothing, waste paper, and any other material. It is even further envisioned that this invention can be used for incinerating biomass wastes including wastes from waterworks or sewage plants, sewage sludge, agricultural wastes including rice husk, rice straw, surplus products, or the like, forestry wastes including sawdust, bark, lumber from thinning, or the like, industrial wastes including pulp-chip dust, or the like, and construction wastes. Even further, this invention this invention can be used to incinerate low-grade coal which includes peat which has a low degree of coalification, or refuse from coal dressing.

Figure 2:
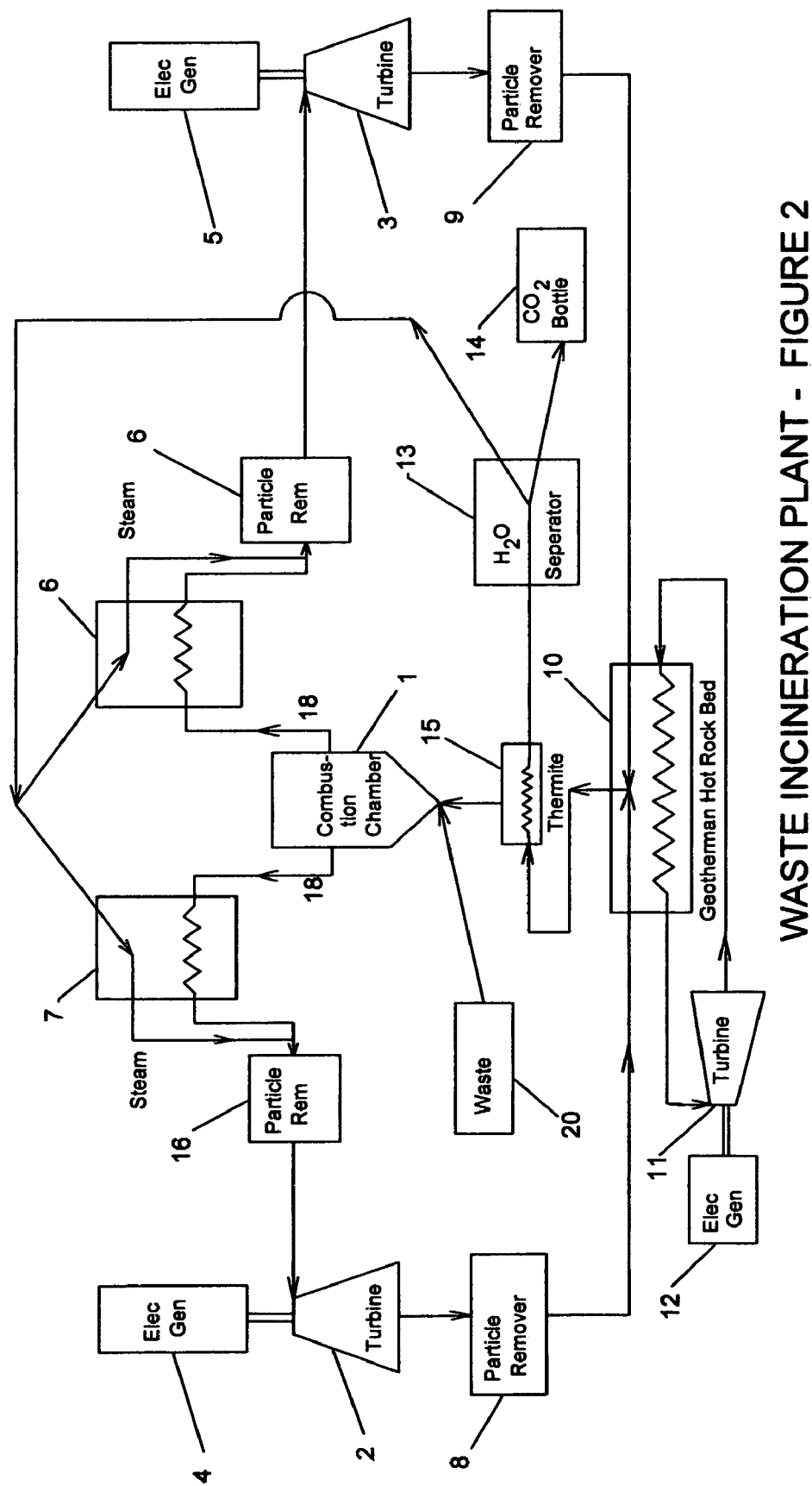
FIG. 2 is a schematic of the second embodiment of the invention, a waste incineration plant.

Reference is made to FIG. 2. In this embodiment of the invention a thermite fuel 15 is fed into a combustion chamber 1 along with a refuse-derived fuel. The feed is in a ratio of thermite fuel and municipal waste so the chamber can achieve a temperature of 3400 degrees Fahrenheit. At that temperature substantially all of the combustion products will be gasified. All potential hazardous components and pollutants such as dioxin will not be formed or rendered harmless, only compounds that can be removed as a solid are reformed after being cooled from that combustion temperature. The gases emitted from the combustion chamber 1 is released at a high volume, high pressure through two opposing graphite lined conduits 18 and 19 leading to a zone 6 and 7 which injects steam into conduits 18 and 19 to further increase pressure and lower temperature. The gases are passed through a means 16 and 17 for removing particulates and then passed through turbines 2 and 3 for producing work or generating electricity in generators 4 and 5. Exhaust gas from the turbines are passed through another means 8 and 9 for removing particulates and thereby lowering the temperature and pressure of the exhaust from the turbine. The gases are then passed through a geo-thermal hot rock bed 10 thereby transferring heat by convection in a heat exchanger to superheat steam in a stream that is separate from the hot rock heat source. This superheated steam powers a third turbine 11 which turns a generator 12 which generates electricity. The steam emitted from the third turbine is recirculated in a closed system. Exhaust gases from the geo-thermal hot rock bed 10 is used to preheat fuel 15 entering the combustion chamber 1 and then the steam is condensed from the gases and separated in condenser 13 and recirculated back to be injection means 6 and 7 upstream of the turbines 2 and 3. The remaining gas (believed to be only CO and $CO_2$) is removed from the system and liquified and bottled in means 14 for commercial use.

Also shown in FIG. 2 and equally applicable to FIG. 1 is port 20 for receiving a substrate into combustion chamber 1 and a means 21 for passing a substrate in and out of the combustion chamber 1.

While the invention is described with particular embodiments in mind, it should be understood that further modifications and variations may be made to the present invention without departing from the inventive concept. Applicants therefore include all of these variations and modifications in this application as part of their invention.

What is claimed is:

1. A high temperature combustion system for producing heat for industrial processes, comprising in combination: A. A combustion chamber having a fuel port coupled with a controlled-burn thermite fuel supply and at least one outlet port for combustion gases, B. A turbine having an inlet port in communication with the combustion chamber to receive the combustion gases, an outlet port for the combustion gases and a power outlet; and wherein the combustion chamber is center fired with the thermite fuel supply and the combustion chamber has two opposing outlet ports.

2. A high temperature combustion system for producing heat for industrial processes, comprising in combination: A. A combustion chamber having a fuel port coupled with a controlled-burn thermite fuel supply and at least one outlet port for combustion gases, B. A turbine having an inlet port in communication with the combustion chamber to receive the combustion gases, an outlet port for the combustion gases and a power outlet; and C. A working fluid injection means having an output port in communication with the combustion gas stream, and an input port, wherein the injection means is upstream of the turbine, and wherein the combination includes a particulate removal means upstream of the turbine and downstream of the working fluid injection means.

3. A high temperature combustion system for producing heat for industrial processes, comprising in combination: A. A combustion chamber having a fuel port coupled with a controlled-burn thermite fuel supply and at least one outlet port for combustion gases, B. A turbine having an inlet port in communication with the combustion chamber to receive the combustion gases, an outlet port for the combustion gases and a power outlet, wherein the thermite fuel is a fuel that burns at a temperature between 2500 and 6000 degrees Fahrenheit, the fuel taken from the group consisting of: A. a mixture of a slow burning thermite fuel and coal; B. a mixture of a slow burning thermite fuel and oil shale; C. a mixture of a slow burning thermite fuel and industrial waste; D. a mixture of a slow burning thermite fuel and municipal waste; E. a mixture of a slow burning thermite fuel and natural gas; and F. A mixture of a slow burning thermite fuel and fuel oil.

4. A high temperature combustion system for producing heat for industrial processes, comprising in combination: A. A combustion chamber having a fuel port coupled with a controlled-burn thermite fuel supply and at least one outlet port for combustion gases; B. A turbine having an inlet port in communication with the combustion chamber to receive the combustion gases, an outlet port for the combustion gases and a power outlet; C. A working fluid injection means having an output port in communication with the combustion gas stream, and an input port, wherein the injection means is upstream of the turbine; D. A heat recovery means having an input port in communication with the output port of the turbine and an output port for the combustion gases and working fluid; E. A working fluid removal means downstream of the heat recovery means; the working fluid removal means having an inlet port in communication with the output port of the heat recovery means; the inlet port receiving the combustion gases and working fluid from the heat recovery means; and the working fluid removal means having a outlet for the remaining gases; and F. A means for collecting the resulting gases from the outlet of the working fluid removal means.

5. The high temperature combustion system of claim 4, wherein the combination includes a means for recycling the working fluid back to the working fluid injection means.

6. The high temperature combustion system of claim 4, wherein the heat recovery means is a geo-thermal hot rock for transferring heat to a second working fluid, wherein said second working fluid is received into an input port of a second turbine which has a power outlet.

\* \* \* \* \*